United States Patent [19]

Ibaraki et al.

[11] Patent Number: 5,927,415

[45] Date of Patent: Jul. 27, 1999

[54] HYBRID VEHICLE CONTROLLER

[75] Inventors: Ryuji Ibaraki, Toyota; Yutaka Taga, Aichi-gun; Hiroshi Hata, Toyota; Atsushi Tabata, Okazaki, all of Japan

[73] Assignee: Toyota Jidosha Kabushiki Kaisha, Toyota, Japan

[21] Appl. No.: 08/679,713

[22] Filed: Jul. 12, 1996

[30] Foreign Application Priority Data

Oct. 20, 1995 [JP] Japan .................................. 7-272170

[51] Int. Cl.⁶ .................................................. B60K 6/00
[52] U.S. Cl. ........................................ 180/65.2; 180/65.3
[58] Field of Search ............................... 180/65.2, 65.3, 180/65.4, 65.6; 364/424.01, 424; 701/1, 22

[56] References Cited

U.S. PATENT DOCUMENTS

| 3,650,345 | 3/1972 | Yardney | 180/65 A |
|---|---|---|---|
| 4,489,242 | 12/1984 | Worst | 307/10 R |
| 5,081,365 | 1/1992 | Field et al. | |
| 5,166,584 | 11/1992 | Fukino et al. | |
| 5,291,960 | 3/1994 | Brandenburg et al. | 180/65.2 |
| 5,492,190 | 2/1996 | Yoshida | 180/65.4 |
| 5,495,912 | 3/1996 | Gray, Jr. et al. | 180/165 |
| 5,566,774 | 10/1996 | Yoshida | 180/65.4 |

FOREIGN PATENT DOCUMENTS

| 0 532 365 A2 | 3/1993 | European Pat. Off. . |
|---|---|---|
| 0 570 234 A1 | 11/1993 | European Pat. Off. . |
| 0 570 240 A1 | 11/1993 | European Pat. Off. . |
| 42 01 142 A1 | 8/1992 | Germany . |
| 43 37 163 A1 | 5/1994 | Germany . |
| 4-5432 | 1/1992 | Japan . |
| 5-328526 | 12/1993 | Japan . |
| 6-80048 | 3/1994 | Japan . |

*Primary Examiner*—Brian L. Johnson
*Assistant Examiner*—Bridget Avery
*Attorney, Agent, or Firm*—Oliff & Berridge, PLC

[57] ABSTRACT

A controller for a hybrid vehicle (HV) idles first an internal combustion engine (ICE) when it is determined in advance that a load on the HV or a motor will increase, and thereafter switches to a travelling mode in which the ICE is used. Based on output of a vehicle weight sensor, a gradient sensor, a towing sensor, a start/power mode switch and other on-board sensors or switches, it is determined in advance that a load on the HV or the motor will increase. Otherwise, based on information obtained from a navigation system or from another vehicle to be towed, it is determined in advance that a load on the HV or the motor will increase. Based on a difference of output between an open air temperature sensor and a cabin temperature sensor, a load on an on-board appliance is detected, and based on the detected load, it is determined in advance that a load on the HV or the motor will increase. Thus, a delay in following the ICE in response to the switching of travelling modes can be decreased or remedied.

10 Claims, 4 Drawing Sheets

| Fig. 1A | Fig. 1B |

Fig. 1

HYBRID VEHICLE CONTROLLER

BACKGROUND OF THE INVENTION a) Field of the Invention

This invention relates to a hybrid vehicle (HV) having a motor and an internal combustion engine (ICE), and particularly to a controller for the HV.

b) Description of the Related Art

In order to improve the fuel consumption of vehicles and to prevent air pollution, various types of HVs having an ICE and a motor have been developed. Among such vehicles, the HV disclosed in Japanese Patent Laid-Open Publication No. Hei 6-80048 has a controller for selectively performing the following driving modes: a sole-motor mode for driving the vehicle by a motor alone, a sole-ICE mode for driving by an ICE alone, and a motor/ICE mode for driving by both the motor and the ICE. A controller mounted on the HV determines according to the HV's driving conditions which mode should be used to drive the HV, and controls respective components such as the above-mentioned ICE and motor to implement the determined mode.

The "driving condition" used here is information on the vehicle speed, the accelerator angle, and the like. For example, the sole-motor mode and sole-ICE mode are basically used when the vehicle speed is low or when the vehicle speed is high, respectively. The motor/ICE mode is used when the accelerator angle is large, i.e., when the vehicle driver requests rapid acceleration, regardless of the vehicle speed (see FIG. 3 of the above-mentioned publication, in which the vehicle speed is shown on the horizontal axis and the accelerator angle on the vertical axis).

In the above-mentioned publication, the driving mode is switched to another driving mode when the index representative of the driving condition falls down below or exceeds a threshold value which is variable according to a state of charge (SOC) or a depth of discharge (DOD) of the on-board battery for supplying the motor with driving electric power and a temperature of the motor (See the arrows in FIG. 3 of the above-mentioned publication and also FIG. 4 of the same publication in which the horizontal axis shows the motor temperatures and the vertical axis shows the threshold value of the accelerator angle.).

In the above prior art a driving mode is determined and switched according to the driving conditions detected prior to the determination. However, such a sequence leads to the controlling delaying the output torque to be supplied to driving wheels. For example, when the accelerator pedal is depressed sharply when the vehicle is running at a low speed, the controller determines that it is necessary to switch the driving mode from the sole-motor mode to the motor/ICE mode, and then issues a command to start the ICE. Here, in general, some start-up period is required for the ICE. Therefore, when switching the driving mode from the sole-motor mode to the motor/ICE mode, after the determination of mode switching is made and the command to perform the mode switching is issued, the driver must wait for the start-up of the ICE.

SUMMARY OF THE INVENTION

One object of the invention is to reduce or prevent a response delay of an ICE in a situation where driving mode switching is necessary. This object is achieved by predicting an increase in load on a vehicle or a motor.

A first aspect of the invention is a controller mounted on an HV having a motor and an ICE, which comprises predicting means for detecting that a load on the HV or motor will exceed a prescribed value when the HV is being driven in a first mode; idling means for idling the ICE according to the detection; and mode switching means for switching the HV's traveling mode from the first mode to a second mode. A second aspect of the invention is a control method which is implemented in an HV having a motor and an ICE, which comprises a step of detecting that a load on the HV or motor will exceed a prescribed value when the HV is being driven in a first mode; a step of idling the ICE according to the detection; and a step of switching the HV's traveling mode from the first mode to a second mode after the idling. A third aspect of the invention is an HV which has a motor which is driven when at least a first mode is being performed; an ICE which is driven when a second mode is performed; and a controller related to the first aspect of the invention. The first mode used here is a driving mode for driving the motor only, and the second mode is a driving mode for driving at least the ICE.

According to the invention, since the ICE is being idled before the load on the HV or its motor is increased, required output is attained by the ICE immediately after the first mode is switched to the second mode, resulting in remedying a shortage of output when starting or accelerating. Also, a fact that the load on the HV or its motor will exceed a prescribed value can be detected easily and inexpensively, by utilizing information obtained from an on-board sensor, the vehicle driver or an external infrastructure, namely, relatively simple information.

For example, based on a fact that a loaded weight has exceeded a threshold value, a road gradient has exceeded a threshold value, prediction has been made that a road gradient will exceed a threshold value, or a rate of change in the accelerator angle has exceeded a threshold value, it is possible to predict that a load on the HV will exceed a prescribed value. Also, the above information such as the loaded weight, road gradient or the rate of change in the accelerator angle which provides the basis of determination can be attained from an on-board sensor. Similarly, based on a fact that a loaded weight has exceeded a threshold value, the HV has started to tow another vehicle, or advance notice has been given to notify that the HV will start to tow another vehicle, it is possible to predict that a load on the HV will exceed a prescribed value in the near future. The above information such as the loaded weight or the towing state can also be supplied by an on-board switch which is operable by the vehicle driver. Thus, the prediction of an increase in load can by implemented by adding some sensors or switches. Especially in the case that the conventional on-board sensor or switch can be used, for example in the case that the accelerator sensor or the like is mounted on the vehicle, such an addition is not necessary.

Also, based on the fact that a road gradient has exceeded a threshold value, the prediction has been made that a road gradient will exceed a threshold value, the HV has entered a highway, or the prediction has been made that the HV will enter a highway, it is possible to predict that a load on the HV will exceed a prescribed value. Such information used to make determination can also be attained by means of a navigation system. For example, from an on-board map database the controller can obtain information on a road gradient, entry into a highway or the like, from the map database. Also, from a navigation system for receiving information from an external infrastructure by radio communication or the like, the controller can obtain information on a road gradient, entry into a highway or the like from the infrastructure. Navigation systems have become widespread or are at least becoming popular these days, so that prediction using such indexes can be easily achieved by diverting information used by navigation systems without adding any special members.

Besides, it is possible to predict that a load on the motor will exceed a prescribed value in view of a fact that the operation of the on-board appliance is difficult or impossible using the motor only. This can be easily and inexpensively achieved by diverting the sensors used for conventional vehicles or by adding a few number of sensors. For example, if the above-described on-board appliance is an air conditioner, the increase of load on the motor can be predicted by detecting and comparing cabin and outside temperatures, so that diverting or mounting of cabin temperature and open air temperature sensors only is sufficient.

The above various types of conditions can be used in combination or together.

The conditions for switching to the second mode are not limited to the magnitude of a load on the HV or the motor. For example, by providing a switch to be operated by the HV driver to turn on to forcedly switch to the second mode, the ICE can be driven in response to a command by the driver. Particularly, by providing a switch which is initially set on by the controller before the vehicle is started, a shortage of output at the time of startup can be remedied.

Besides, in the second mode, a component such as the motor may be used to drive the HV in cooperation with the ICE. For example, a plurality of sub-modes which form the second mode are provided, namely a first sub-mode for driving the ICE alone, a second sub-mode for power driving of the motor while driving the ICE, and a third sub-mode for generative driving of the motor for generating electricity while driving the ICE. To perform the second mode, the vehicle can be driven in various forms by selectively performing any of the first to third sub-modes according to a command from the vehicle driver or output requested by the vehicle driver.

BRIEF DESCRIPTION OF THE DRAWINGS

FIG. 1 is a diagram showing the arrangements of FIG. 1A and FIG. 1B.

DETAILED DESCRIPTION OF THE PREFERRED EMBODIMENTS

Figure 1A:
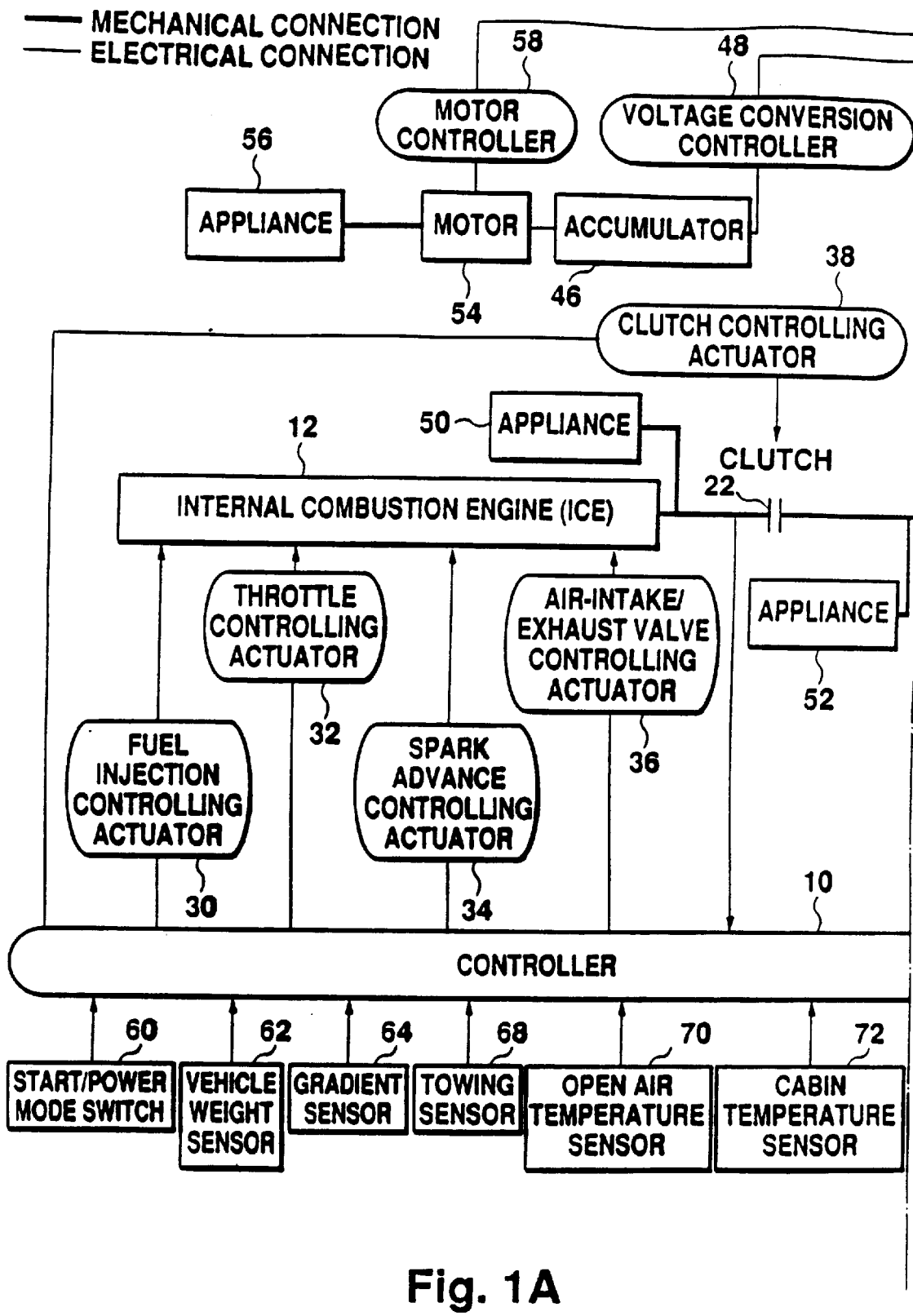
FIG. 1A is a block diagram showing a left half of the system configuration of an HV according to one embodiment of the invention.
Figure 1B:
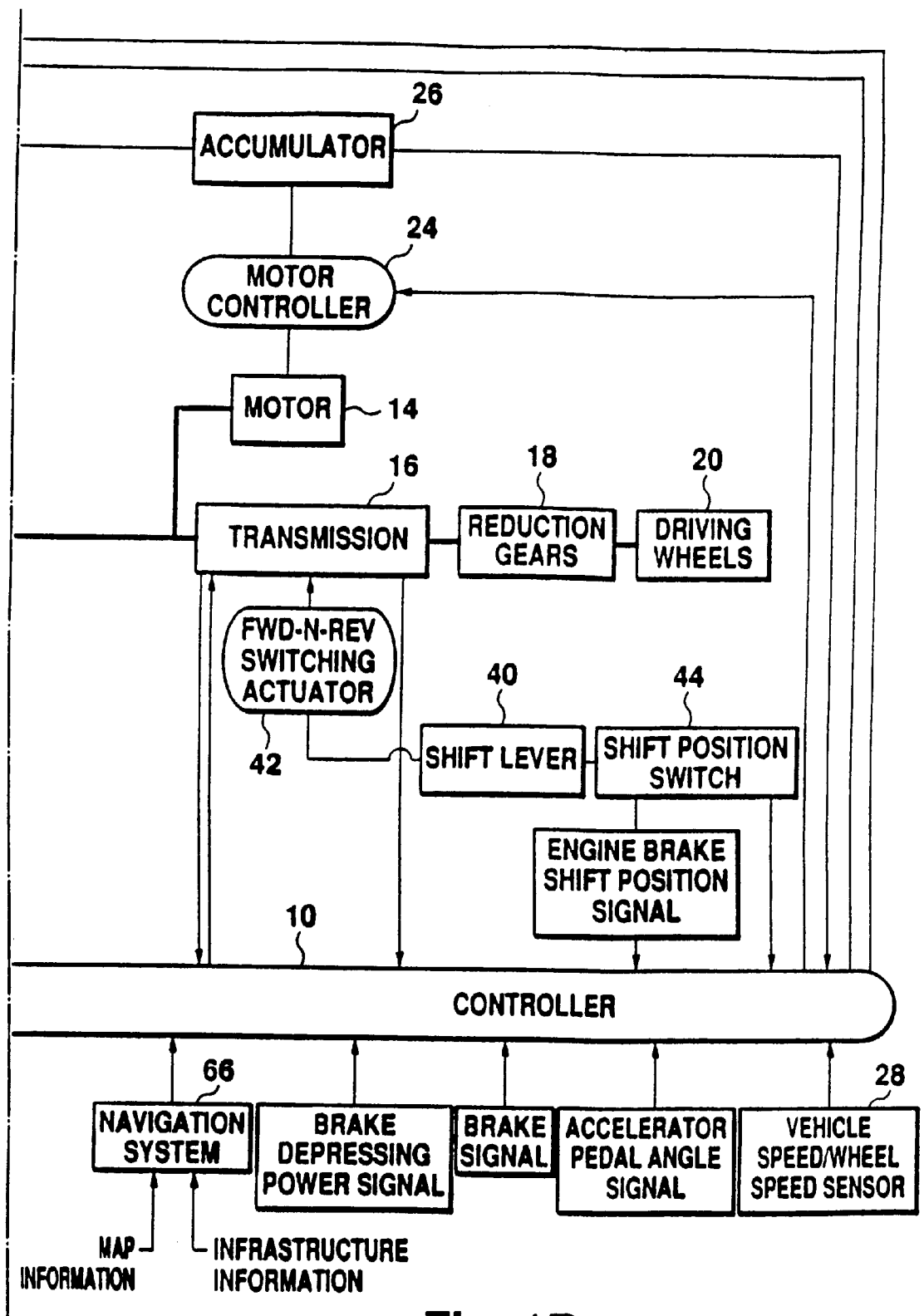
FIG. 1B is a block diagram showing a right half of the system configuration of an HV according to the embodiment.
Figure 2:
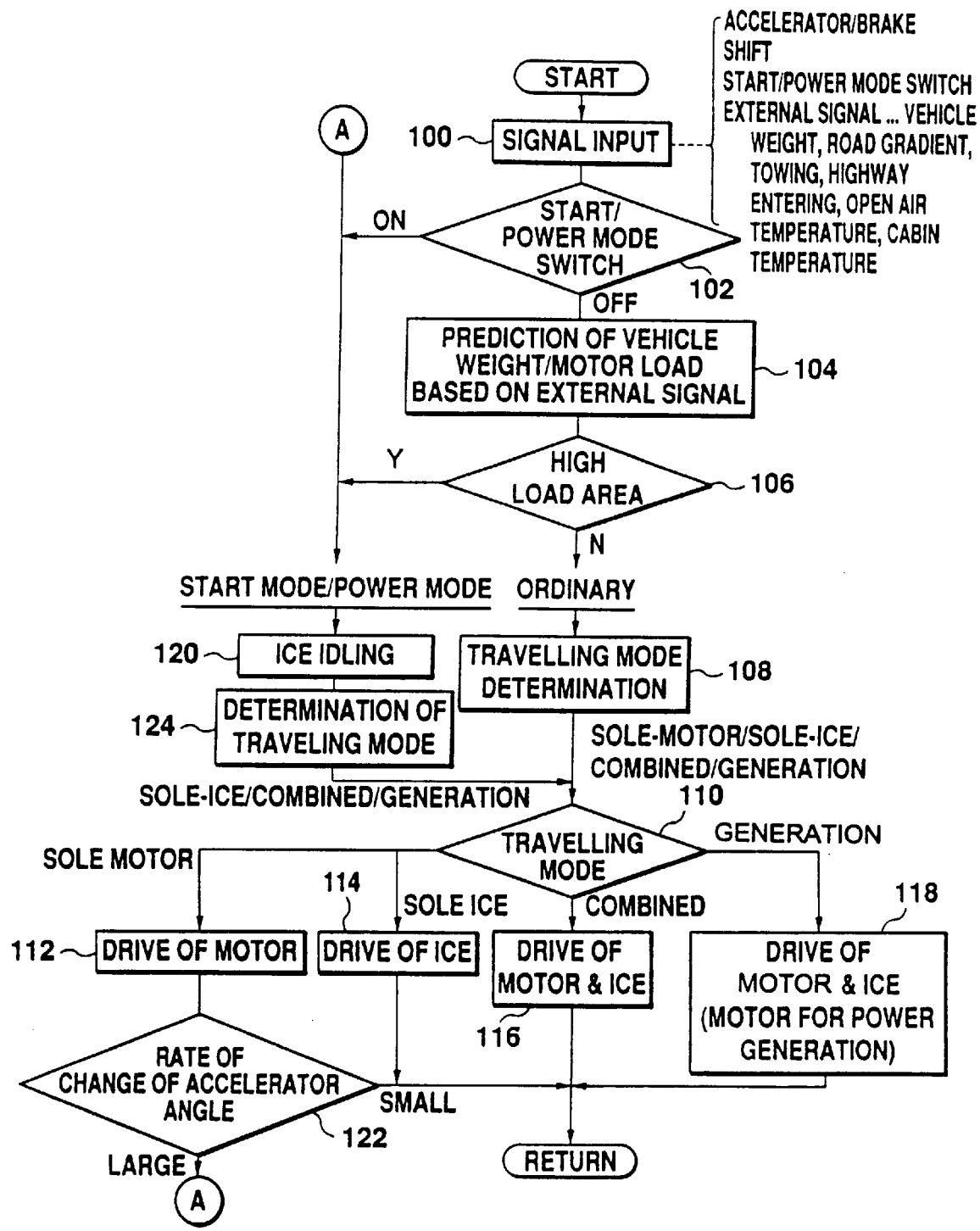
FIG. 2 is a flowchart showing the operation of a controller in the above embodiment, and particularly the mode control operation.

Preferred embodiments of the invention will be described with reference to the accompanying drawings. FIG. 1A and FIG. 1B show the system configurations of an HV according to one embodiment of the invention, and FIG. 2 shows a flow of the mode control operation which is repeatedly performed at prescribed intervals by a controller 10. FIG. 1A and FIG. 1B show mechanical connections by a thick solid line and electrical connections by a thin solid line.

A vehicle according to this embodiment has an ICE 12 and a motor 14 as propulsion means. The motor 14 is connected to driving wheels 20 through a transmission 16 and reduction gears 18. The ICE 12 is connected to the motor 14 through a clutch 22 on one hand, and to the driving wheels 20 through the transmission 16 and the reduction gears 18 on the other hand. Therefore, this embodiment can perform a sole-ICE mode for driving the vehicle by the ICE 12 alone, a sole-motor mode for driving the vehicle by the motor 14 alone, and a motor/ICE mode for driving the vehicle by both the ICE 12 and the motor 14. Since the motor 14 can be operated not only as a motor but also as a generator, the motor/ICE mode can be subdivided into a sub-mode for power driving by the motor 14 and a sub-mode for generating electricity by it. The controller 10 selects a mode and a sub-mode thereof according to a request by the vehicle driver for output to be supplied to the driving wheels 18. To do so, the same logic (including a change in the threshold value) as in Japanese Patent Laid-Open Publication No. Hei 6-80048 may be used.

Based on an accelerator pedal angle signal which indicates an accelerator pedal angle, a brake signal indicating that the brake pedal is depressed, a brake depressing power signal indicating a leg power applied to the brake pedal, the vehicle speed/wheel speed detected by a vehicle speed/wheel speed sensor 28, a shift position signal to be described afterward, or an engine brake shift position signal to be described afterward, the controller 10 produces and supplies a control signal to a motor controller 24 to control the power conversion of voltage and a current supplied from an accumulator 26 to the motor 14. The accumulator 26 as a power source for the motor 14 is a secondary battery, a capacitor or the like, and the motor controller 24 is an inverter for example. Through the above-mentioned motor torque control over the control area including a power driving area and a regeneration area, the controller 10 maintains the SOC of the accumulator 26 in a prescribed range.

The controller 10 refers to an engine rotation speed Ne and a catalyst temperature of the ICE 12 to control the output of the ICE 12 by actuators 30, 32, 34, 36, the actuator 30 being used to control the fuel injection of the ICE 12, the actuator 32 being used to control a throttle angle, the actuator 34 being used to control a spark advance, and the actuator 36 being used to control air-intake and exhaust valves. The controller 10 controls the clutch 22 by an actuator 38, to perform the sole-motor mode with the clutch 22 disengaged and to prevent the ICE 12 from becoming a load on the motor 14 in this mode. The controller 10 controls the clutch 22 to perform the sole-ICE mode, and the motor/ICE mode can be performed with the clutch 22 engaged. Furthermore, to start the ICE 12, the controller 10 engages the clutch 22 and thereafter drives the motor 14. In other words, the motor 14 can be used as a starter.

When a shift lever 40 is operated by the vehicle driver, an actuator 42 is operated accordingly to change the gear ratio of the transmission 16. A shift position switch 44 supplies the controller 10 with a shift position signal indicating a range where the shift lever 40 is positioned. In this embodiment, an engine brake range is also provided to enable the driver to manually operate engine braking torque. When the shift lever 40 is the engine brake range, the shift position switch 44 supplies the controller 10 with an engine brake shift position signal indicating the position of the shift lever 40 in the engine brake range. The controller 10 refers to an input rotation speed Ni and an output rotation speed No of the transmission 16 to switch a gear ratio or to engage the clutch 22 with less friction or slip.

Besides, the on-board appliances include electrically driven appliances and mechanically driven appliances. The former, namely electrical appliances, include electrical circuits driven by electric power supplied from the accumulator 26, an accumulator 46 or the motor 14 operating as a generator. Examples include unillustrated wipers, lamps, electrically driven air conditioner and electrically driven pump, in addition to the controller 10 and the actuators 30, 32, 34, 36, 38 and 42. While the accumulator 26 is used to drive both of the motor 24 and the relatively large powered appliances (e.g., electrically driven air conditioner), the accumulator (e.g., secondary battery or capacitor) 46 is used only to drive the appliances consuming relatively small power, since the voltage (e.g., 12 v) required to drive the controller 10, lamps etc. is lower than the voltage (e.g., 250 v) required to drive the motor 14 etc. A voltage conversion controller 48 includes, for example, a chopper circuit to convert the discharged output of the accumulator 26 into a lower voltage under the control of the controller 10, and applies the obtained voltage to the accumulator 46 and its load. The controller 10 controls and maintains the SOC of the accumulator 46 using the voltage conversion controller 48.

The mechanical appliances include an appliance 50 connected to the ICE 12, an appliance 52 connected to the motor 14, and an appliance 56 connected to a motor 54. The appliances 50, 52 can be driven by the ICE 12 and the motor 14 respectively, and can also be driven by both the ICE 12 and the motor 14 when the clutch 22 is engaged. Since the motor 54 is driven by the discharged power of the accumulator 46, the appliance 56 can be driven regardless of the states of the ICE 12, the motor 14 and the clutch 22. In the drawing, a motor controller 58 controls output of the motor 54 under the control of the controller 10. Examples of the mechanical appliances include the compressor of a mechanically driven air conditioner, various types of pumps, etc.

The controller 10 controls the systems shown in FIG. 1A and FIG. 1B by repeatedly performing the mode control sequence shown in FIG. 2 at prescribed intervals. In FIG. 2, the controller 10 first receives the accelerator pedal angle signal, brake signal, brake depressing power signal, shift position signal and engine brake shift position signal, as well as the state of a start/power mode switch 60 and various types of externals signals (100). The start/power mode switch 60 shown in FIG. 1A can be turned on/off by the vehicle driver and is automatically set "on" immediately after the power supply to the controller 10 is turned "on". For example, the driver can turn this switch 60 on to drive the ICE 12 when starting the vehicle on a sloping road, towing another vehicle or starting the vehicle with a load the driver thinks is heavy. The external signals include, for example, an on-board weight signal, a road gradient signal, a towing weight signal, a highway entering signal, an open air temperature signal, and a cabin temperature signal.

Among these external signals, the on-board weight signal is obtained from, for example, a vehicle weight sensor 62, indicating the weight of the vehicle, passengers or baggage, or a total weight thereof. The road gradient signal is obtained by a gradient sensor 64 or from a navigation system 66, indicating a road gradient where the vehicle is now travelling or will travel shortly. Particularly, the gradient sensor 64 can be used to ascertain a road gradient where the vehicle is now travelling. The navigation system 66 can also be used to ascertain a rough value of a road gradient where the vehicle is now travelling and/or where the vehicle will travel shortly. The towing weight signal is obtained by a towing sensor 68, indicating the weight of a vehicle being towed. This signal can be obtained by radio communication from the vehicle being towed. The highway entering signal is obtained by the navigation system 66, for example by the radio communication between the vehicle antenna and the toll gate antenna provided at the interchange or the like, indicating that the vehicle has entered, is entering or will soon enter, a highway. Details of the navigation system 66 and its infrastructure are omitted here because such system and infrastructure are apparent to the ordinary skilled person. The open air temperature signal and the cabin temperature signal are obtained by an open air temperature sensor 70 and a cabin temperature sensor 72 respectively, indicating temperatures outside and inside of the vehicle.

The navigation system 66 produces external signals such as a road gradient signal and a highway entering signal according to map information of the map database (not shown: e.g., CD-ROM) mounted on the vehicle. Otherwise, the navigation system 66 receives beacons from sign posts disposed at predetermined intervals along a road, transmitters disposed on gates or gantries, spanning a road, or a leakage coaxial cable provided along a road, and produces external signals such as a road gradient signal and a highway entering signal according to the received beacons. The navigation system 66 also picks up map information from traffic information provided by radio communication or broadcasting, and produces external signals such as a road gradient signal and a highway entering signal according to the map information. A navigation system provided with the above-described functions, except for a map database with road gradient information, is already adopted under the name of a Vehicle Information and Communication System (VICS) in Japan. It is to be understood that the infrastructure in this invention includes the VICS infrastructure but is not limited to it.

As shown in FIG. 2, when the start/power mode switch 60 is off (102) and the near-future vehicle load or motor load predicted according to an external signal in step 104 is sufficiently small (106), the controller 10 determines the vehicle's traveling mode according to a vehicle driver's request given in the form of the accelerator angle or brake depressing power signals, the operating conditions of various types of appliances, and the SOC of each accumulator (108), and controls the ICE 12 and the motor 14 accordingly (110). For example, when the determined travelling mode is the sole-motor mode, only the motor 14 is driven (112); when it is the sole-ICE mode, only the ICE 12 is driven (114); and when it is the motor/ICE mode, both the ICE 12 and the motor 14 are driven (116, 118). In particular, in the motor/ICE mode, the driving condition is diverged according to whether the motor 14 is used for power driving (116) or for electric power generation (118). After implementing steps 112, 114, 116 and 118, the sequence shown in FIG. 2 terminates and the controller 10 shifts to the operation according to not-shown main routine, except for some cases which will be described later.

When the start/power mode switch 60 is on (102), the controller 10 starts the ICE 12 regardless of external signals and idles the ICE 12 (120). When the near-future vehicle load or motor load predicted according to an external signal (104) is large (106), the controller 10 determines that it is necessary to drive the ICE 12, starts the ICE 12 and idles it (120). When a rate of change of the accelerator angle in the sole-motor mode exceeds a prescribed value (122), the controller 10 starts the ICE 12 and idles it (120). After idling the ICE 12 in step 120, the controller 10 determines the vehicle's traveling mode according to a vehicle driver's request given in the form of the accelerator angle or brake depressing power signals, the operating conditions of various types of appliances and the SOC of each accumulator (124), and performs the sequences of step 110 and following steps. In addition, in the case that step 120 is carried out due to large accelerator changing rate, a control signal is given to the motor controller 24 to control the motor 14 so that output required to start the ICE 12 is added to the existing output of the motor 14. Please note that since the ICE 12 is to be driven, the travelling mode selectable in step 124 is limited to either one of sole-ICE, combined (power driving) or generation modes.

Thus, in this embodiment, it is detected that the switch 60 is on, the ICE 12 is previously idled accordingly, and shifting to a mode using the ICE 12 is effected, so that a request by the vehicle driver who wants to use the ICE 12 can be implemented. Since this embodiment detects a tendency of increase in the accelerator angle in view of its rate of change and controls the idling-mode shifting, the vehicle driver's intention of quickly accelerating can be satisfied without any delay due to ICE starup. Besides, when sufficient power cannot be supplied to the driving wheels 20 unless the ICE 12 is driven (e.g., when the near-future vehicle load predicted according to an external signal is large), the same idling-mode shifting is effected, so that torque required for a sudden start or a start on a gradient can be produced immediately, causing no shortage in torque. In this embodiment, when sufficient power cannot be supplied to the appliance 52 unless the ICE 12 is driven (when the near-future motor load predicted according to an external signal is large), the same idling-mode shifting is effected, so that deterioration of a cabin atmosphere due to insufficient power of the appliance 52 (e.g., the air conditioner) can be prevented.

While there have been described what are at present considered to be preferred embodiments of the invention, it is to be understood that various modifications may be made thereto, and it is intended that the appended claims cover all such modifications as fall within the true spirit and scope of the invention.

What is claimed is:

1. A controller mounted on a hybrid vehicle having a motor and an internal combustion engine, the controller comprising:

detecting means for detecting specified operating conditions affecting the hybrid vehicle;

a controller that determines in advance, based on the specified operating conditions, that a load on said hybrid vehicle or motor will exceed a prescribed value at a future time when said hybrid vehicle is being driven in a first mode;

idling means for idling the internal combustion engine according to the determination; and mode switching means for keeping the hybrid vehicle mode in the first mode when the load on said hybrid vehicle or motor does not exceed the prescribed value, and for switching said hybrid vehicle's traveling mode from said first mode to a second mode after the idling and when the load on said hybrid vehicle or motor actually exceeds the prescribed value, said first mode being a traveling mode for driving the motor only and said second mode being a traveling mode for driving at lease the internal combustion engine.

2. The controller according to claim 1, wherein said controller determines in advance when at least one of the following conditions is satisfied, that the load on said hybrid vehicle will exceed said prescribed value:

that an on-board weight has exceeded its threshold value, that a road gradient has exceeded its threshold value;

that a determination has been made that a road gradient will exceed its threshold value;

that a rate of change in the accelerator angle has exceeded its threshold value;

that said hybrid vehicle has started to tow another vehicle;

that an advance notice has been given to notify that said hybrid vehicle will start to tow another vehicle;

that said hybrid vehicle has entered a highway; and that a determination has been made that said hybrid vehicle will enter a highway.

3. The controller according to claim 1, wherein said controller determines in advance that the load on said motor will exceed said prescribed value when an on-board appliance cannot be driven at a normal operating level by output of said motor alone.

4. The controller according to claim 1 further comprising:

a switch to be operated by a driver of said hybrid vehicle; and means for forcedly shifting to said second mode when said switch is on.

5. The controller according to claim 1, wherein:

said second mode includes a first sub-mode for driving the internal combustion engine alone, a second sub-mode for power driving of the motor while driving the internal combustion engine, and a third sub-mode for driving the motor to generate electricity while driving the internal combustion engine; and said controller further comprises means for selectively performing one of the first to third sub-modes according to a command given by a driver of the hybrid vehicle or output requested by said driver, when said second mode is to be performed.

6. A control method which is implemented in a hybrid vehicle having a motor and an internal combustion engine, comprising the following steps:

detecting operating conditions of the hybrid vehicle;

determining in advance that a load on said hybrid vehicle or motor will exceed a prescribed value at a future time when said hybrid vehicle is being driven in a first mode;

idling the internal combustion engine according to the determination;

keeping the hybrid vehicle mode in the first mode when the load on said hybrid vehicle or motor does not exceed the prescribed value; and switching the hybrid vehicle's traveling mode from the first mode to a second mode after the idling step and when the load on said hybrid vehicle or motor actually exceeds the prescribed value, said first mode being a traveling mode for driving the motor only, and said second mode being a traveling mode for driving at least the internal combustion engine.

7. A hybrid vehicle comprising:

a motor which is driven when at least a first mode is being performed, an internal combustion engine which is driven when a second mode is performed, and a controller;

said controller including:

detecting means for detecting operating conditions that affect the hybrid vehicle;

determining means for determining in advance, based on the detected operating conditions, that a load on said hybrid vehicle or motor will exceed a prescribed value at future time when said hybrid vehicle is being driven in the first mode;

idling means for idling the internal combustion engine according to the determination; and mode switching means for keeping the hybrid vehicle mode in the first mode when the load on said hybrid vehicle or motor does not exceed the prescribed value, and for switching said hybrid vehicle's traveling mode from said first mode to said second mode after the idling and when the load on said hybrid value or motor actually exceeds the prescribed value at a future time;

said first mode being a traveling mode for driving the motor only and said second mode being a mode for driving at least the internal combustion engine.

8. The controller of claim 1, wherein the mode switching means further comprises means for determining the traveling mode by detecting whether the load on the motor has exceeded the prescribed value when said hybrid vehicle is being driven in the first mode and the internal combustion engine is idling.

9. The method of claim 6, further comprising a step, after the idling step, of determining the traveling mode by detecting whether the load on the motor has exceeded the prescribed value.

10. The controller of claim 7, wherein the mode switching means further comprises means for determining the traveling mode by detecting whether the load on the motor has exceeded the prescribed value when said hybrid vehicle is being driven in the first mode and the internal combustion engine is idling.

* * * * *